United States Patent
Kutsubo et al.

(10) Patent No.: US 9,546,730 B2
(45) Date of Patent: Jan. 17, 2017

(54) HYDRAULIC CONTROL DEVICE FOR AUTOMATIC TRANSMISSION

(71) Applicant: AISIN AW CO., LTD., Anjo-shi, Aichi-ken (JP)

(72) Inventors: Hiroyuki Kutsubo, Nagoya (JP); Kazuki Kojima, Nukata (JP); Koji Makino, Okazaki (JP); Yoshimitsu Hyodo, Nishio (JP); Kenichi Tsuchida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/031,055

(22) PCT Filed: Jan. 30, 2015

(86) PCT No.: PCT/JP2015/052687
§ 371 (c)(1),
(2) Date: Apr. 21, 2016

(87) PCT Pub. No.: WO2015/115602
PCT Pub. Date: Aug. 6, 2015

(65) Prior Publication Data
US 2016/0265656 A1    Sep. 15, 2016

(30) Foreign Application Priority Data

Jan. 31, 2014 (JP) .................................. 2014-018004

(51) Int. Cl.
*B60W 10/02* (2006.01)
*F16H 61/02* (2006.01)
(Continued)

(52) U.S. Cl.
CPC ...... *F16H 61/0206* (2013.01); *F16H 61/0021* (2013.01); *F16H 61/0276* (2013.01); *F16H 61/14* (2013.01); *F16D 25/14* (2013.01)

(58) Field of Classification Search
CPC .. F16H 61/0206; F16H 61/14; F16H 61/0021; F16H 61/0276; F16H 25/14
See application file for complete search history.

(56) References Cited

U.S. PATENT DOCUMENTS

| | | | |
|---|---|---|---|
| 8,517,877 B2 * | 8/2013 | Ishikawa | F16H 61/0021 475/127 |
| 2003/0119618 A1 * | 6/2003 | Iwata | F16H 61/0206 475/127 |

(Continued)

FOREIGN PATENT DOCUMENTS

| | | |
|---|---|---|
| JP | H06-341534 A | 12/1994 |
| JP | 2008-128336 A | 6/2008 |

(Continued)

OTHER PUBLICATIONS

Apr. 28, 2015 Search Report issued in International Patent Application No. PCT/JP2015/052687.

Primary Examiner — David J Hlavka
(74) Attorney, Agent, or Firm — Oliff PLC (57) ABSTRACT

A hydraulic control device is provided with a solenoid valve, a pressure regulating valve, a switching valve, and a control unit. The control unit, when shifting from a first shift speed to a second shift speed, causes a first signal pressure to be input to an oil chamber of the switching valve with the pressure regulating valve, and presses a valving element to a first input port side to be locked at a blocking position at which communication between the first input port and an output port is blocked at least until a third engagement element is brought into an engaged state from a disengaged state.

10 Claims, 6 Drawing Sheets (51) Int. Cl.
　　　*F16H 61/00*　　　(2006.01)
　　　*F16H 61/14*　　　(2006.01)
　　　　F16D 48/02　　　(2006.01)

(56) References Cited

U.S. PATENT DOCUMENTS

| | | | |
|---|---|---|---|
| 2008/0207396 A1* | 8/2008 | Soga | F16H 61/0021 477/168 |
| 2012/0247902 A1* | 10/2012 | Moorman | F16H 61/0206 192/3.58 |
| 2016/0265656 A1* | 9/2016 | Kutsubo | F16H 61/0021 |

FOREIGN PATENT DOCUMENTS

| | | |
|---|---|---|
| JP | 2008-157426 A | 7/2008 |
| JP | 2010-164176 A | 7/2010 |

* cited by examiner

|      | C1 | C2 | C3 | C4 | B1 | B2 |
|------|----|----|----|----|----|----|
| Rev  |    |    | ○  |    |    | ○  |
| N    |    |    |    |    |    | ○  |
| 1st  | ○  |    |    |    |    | ○  |
| 2nd  | ○  |    |    |    | ○  |    |
| 3rd  | ○  |    | ○  |    |    |    |
| 4th  | ○  |    |    | ○  |    |    |
| 5th  | ○  | ○  |    |    |    |    |
| 6th  |    | ○  |    | ○  |    |    |
| 7th  |    | ○  | ○  |    |    |    |
| 8th  |    | ○  |    |    | ○  |    |

HYDRAULIC CONTROL DEVICE FOR AUTOMATIC TRANSMISSION

TECHNICAL FIELD

Aspects of preferred embodiments relate to a hydraulic control device for an automatic transmission provided with a plurality of engagement elements to be mounted, for example, on a vehicle, and in particular to a hydraulic control device for an automatic transmission that is capable of, in order to prevent a predetermined plurality of engagement elements from being engaged at a same time, blocking a supply pressure for a predetermined engagement element among the plurality of engagement elements.

BACKGROUND ART

Conventionally, a stepped automatic transmission to be mounted, for example, on a vehicle controls engagement states of a plurality of engagement elements (clutch, brake, one-way clutch) with a hydraulic control device and enables a multistage speed change by establishing a transmission path in a speed change mechanism at each shift speed. A hydraulic control device not using a one-way clutch as an engagement element has prevailed as such a hydraulic control device (refer to Patent Document 1). The hydraulic control device not using a one-way clutch is provided with an engagement element (for example, a second brake B2) that is engaged when establishing at least a first forward speed and a reverse speed, an engagement element (for example, a third clutch C3) that is engaged when establishing at least a third forward speed and the reverse speed, and an engagement element (for example, a first clutch C1) that is engaged when establishing at least the first forward speed. In the hydraulic control device, a forward range pressure and a reverse range pressure are switched to be used as a source pressure to a linear solenoid valve SLC3 that supplies an engagement pressure to a hydraulic servo of the third clutch C3, and a shuttle valve is used to switch between the forward range pressure and the reverse range pressure. In a case in which an engagement element (for example, the second brake B2) that is commonly used at the first forward speed, N-range, and the reverse speed is provided, the engagement element is continuously engaged at garage shifting such as a switching between N-range and D-range, a switching between R-range and D-range, etc.

RELATED ART DOCUMENT

Patent Document

Patent Document 1: Japanese Patent Application Publication No. 2008-128336 (JP 2008-128336 A)

SUMMARY

However, in the aforementioned hydraulic control device, a shuttle valve is used. Therefore, for example, in a case in which the linear solenoid valve that supplies an engagement pressure to the hydraulic servo of the third clutch is in a failure of a fixed open state, the third clutch may keep engaged due to the forward range pressure when switching from N-range or R-range to the first forward speed.

In the same manner, when establishing a shift speed by engaging two or three engagement elements at a same time and performing a speed change by switching the engagement of one of the two or three engagement elements, in a case in which a failure of a fixed open state has occurred at a linear solenoid valve that supplies and discharges an engagement pressure to an engagement element to be switched from an engaged state to a disengaged state at the speed change, a problem as mentioned below may occur due to the use of a shuttle valve. That is, in such a case, the source pressure before the speed change for the linear solenoid valve is supplied to the linear solenoid valve in the failure of a fixed open state via the shuttle valve, the engagement element before engagement switching may be re-engaged again before the engagement pressure is fully discharged after disengagement. In a case in which the re-engagement of the engagement element occurs in such a manner, just after the engagement is switched to the engagement element after engagement switching, the engagement element that maintains engagement and the engagement element before engagement switching may be engaged at a same time for an instant, thereby unexpected shock may be generated.

Thus, an object is to provide a hydraulic control device for an automatic transmission that is capable of, when shifting from a first shift speed to a second shift speed, blocking a supply of a first source pressure to an engagement element that is engaged when establishing the first shift speed and disengaged when establishing the second shift speed even when a solenoid valve that supplies and discharges an engagement pressure to and from the engagement element is in the failure of the open state.

Means for Solving the Problem

A hydraulic control device for an automatic transmission provided with a plurality of engagement elements including a first engagement element that is operated by hydraulic pressure and engaged at both a first shift speed and a second shift speed, a second engagement element that is operated by hydraulic pressure, engaged when establishing the first shift speed (REV), and disengaged when establishing the second shift speed, and a third engagement element that is operated by hydraulic pressure, disengaged when establishing the first shift speed, and engaged when establishing the second shift speed, the hydraulic control device for the automatic transmission including:

a solenoid valve capable of supplying an engagement pressure to the second engagement element;

a pressure regulating valve capable of supplying a first signal pressure;

a switching valve having a first input port to which a first source pressure is input, a second input port to which a second source pressure is input, an output port that is allocated between the first input port and the second input port, a valving element that is movably allocated between the first input port and the second input port, moves to an input port side of a source pressure with a lower pressure between the first source pressure (PD, $P_{EMOP}$) and the second source pressure, blocks communication between the input port of the source pressure with the lower pressure and the output port, establishes communication between an input port of a source pressure with a higher pressure and the output port, and causes the source pressure with the higher pressure to be output from the output port, a moving member capable of switching between a locked state in which the valving element is pressed to the first input port side and locked at a blocking position at which the communication between the first input port and the output port is blocked and an unlocked state in which the valving element is movable, and an oil chamber that receives an input of the first signal pressure from the pressure regulating valve and causes the first signal pressure to operate to move the moving member to the blocking position, and capable of selectively supplying the first source pressure and the second source pressure to the solenoid valve; and a control unit that, when shifting from the first shift speed to the second shift speed, causes the first signal pressure to be input to the oil chamber of the switching valve with the pressure regulating valve at least until the third engagement element is brought into an engaged state from a disengaged state.

Effects

According to the present hydraulic control device for the automatic transmission, the control unit, when shifting from the first shift speed to the second shift speed, causes the first signal pressure to be input to the oil chamber of the switching valve with the pressure regulating valve at least until the third engagement element is brought into the engaged state from the disengaged state. Therefore, at least until the third engagement element is brought into the engaged state from the disengaged state, the switching valve becomes in the locked state. Therefore, the first source pressure is blocked by the valving element. Thereby, at the solenoid valve for the second engagement element which is engaged at the first shift speed and disengaged at the second shift speed, even in a case in which the failure of a fixed open state has occurred when shifting speed, it is possible to block the supply of the first source pressure.

BRIEF DESCRIPTION OF THE DRAWINGS

FIG. 5 is a timing chart showing a change in an actual hydraulic pressure of each part at a time of switching from N-range to D-range at the hydraulic control device according to the embodiment.

DESCRIPTION

Hereinafter, various exemplary embodiments will be explained with reference to FIGS. 1 to 6.

Initially, a schematic configuration of an automatic transmission 1 preferably mounted on a vehicle of, for example, FF (front drive/front engine) type, to which the automatic transmission of a preferred embodiment can be applied, is explained with reference to FIG. 1. The automatic transmission 1 includes a case 4 that is constituted by a mission case, a housing case that contains a torque converter (hydraulic power transmission device) 7, etc. Inside the mission case, a speed change mechanism 2, a countershaft part 80, and a differential part 90 are allocated. The speed change mechanism 2 is allocated on an axis having a center at an input shaft 12 and an intermediate shaft 13 that are on a same axis as an input shaft 11 of the automatic transmission 1 connected to an output shaft of, for example, an engine (not shown). A countershaft 81 of the countershaft part 80 is allocated on an axis parallel to the input shaft 12 and the intermediate shaft 13. Further, the differential part 90 is allocated on an axis parallel to the countershaft 81 so as to include left and right axles 93$l$, 93$r$.

Note that, in the automatic transmission 1 preferably mounted on a vehicle of FF type which is explained below, the horizontal direction in FIG. 1 corresponds to the horizontal direction on the vehicle under the practical condition. In a certain mounting direction, the right side in FIG. 1 corresponds to the left side on the vehicle and the left side in FIG. 1 corresponds to the right side of the vehicle. However, in the explanation below, when "right side" or "left side" is simply referred, "right side" or "left side" in FIG. 1 is indicated.

The torque converter 7 includes a pump impeller 7$a$ connected to the input shaft 11 of the automatic transmission 1, and a turbine runner 7$b$ to which rotation of the pump impeller 7$a$ is transmitted via a working fluid. The turbine runner 7$b$ is connected to the input shaft 12 of the speed change mechanism 2 that is allocated on a same axis as the input shaft 11. The torque converter 7 also includes a lock-up clutch 10 that is capable of locking up the pump impeller 7$a$ and the turbine runner 7$b$. When the lock-up clutch 10 is engaged by hydraulic control of the hydraulic control device 20 that is described later, rotation of the input shaft 11 of the automatic transmission 1 is directly transmitted to the input shaft 12 of the speed change mechanism 2.

The speed change mechanism 2 includes, on the input shaft 12 and the intermediate shaft 13, a planetary gear (speed-reducing planetary gear) DP and a planetary gear unit (planetary gear set) PU. The planetary gear DP is a so-called double-pinion planetary gear, which includes a sun gear S1, a carrier CR1, and a ring gear R1 and in which the carrier CR1 has pinions $P_1$ meshed with the sun gear S1 and pinions $P_2$ meshed with the ring gear R1 in such a manner that the pinions $P_1$ and the pinions $P_2$ are meshed with each other.

Meanwhile, the planetary gear unit PU is a so-called Ravigneaux type planetary gear, which includes four rotary elements, namely a sun gear S2, a sun gear S3, a carrier CR2 (CR3, refer to FIG. 3), and a ring gear R3 (R2, refer to FIG. 3) and in which the carrier CR2 has long pinions $P_4$ meshed with the sun gear S2 and the ring gear R3 and short pinions $P_3$ meshed with the sun gear S3 in such a manner that the long pinions $P_4$ and the short pinions $P_3$ are meshed with each other.

The sun gear S1 of the planetary gear DP is connected to the case 4 and stationary in terms of rotation. In addition, the carrier CR1 is connected to the input shaft 12 so as to make the same rotation (hereinafter referred to as "input rotation") as rotation of the input shaft 12, and connected to a second clutch C2. Further, the ring gear R1 makes reduced-speed rotation that is reduced in speed compared to the input rotation through the sun gear S1 which is stationary and the carrier CR1 which makes the input rotation, and is connected to a first clutch (third engagement element) C1 and a third clutch (second engagement element) C3.

The sun gear S2 of the planetary gear unit PU is connected to a first brake B1 to be selectively stationary with respect to the case 4. In addition, the sun gear S2 is connected to the fourth clutch C4 to which rotation of the input shaft 12 is input via the intermediate shaft 13 and the third clutch C3 so as to selectively receive the input rotation of the input shaft 12 via the fourth clutch C4 and the reduced-speed rotation of the ring gear R1 via the third clutch C-3. Further, the sun gear S3 is connected to the first clutch C1 so as to selectively receive the reduced-speed rotation of the ring gear R1.

In addition, the carrier CR2 is connected to the second clutch C2 so as to selectively receive the input rotation via the second clutch C2, and connected to a second brake (first engagement element) B2 so as to be selectively locked (stationary) in terms rotation due to the second brake B2. In addition, the ring gear R3 is connected to a counter gear 15.

On the other hand, a large diameter gear 82 meshed with the counter gear 15 is allocated on the left side end of the counter shaft 81 of the countershaft part 80, and a small-diameter gear 83 is allocated on the right side end. In addition, in the differential part 90, a differential gear device 91 is allocated, and a differential ring gear 92 of the differential gear device 91 is meshed with the small-diameter gear 83. That is, rotation of the counter gear 15 is transmitted to the differential ring gear 92 of the differential gear device 91 via the large-diameter gear 82, the counter shaft 81, and the small-diameter gear 83, and rotation of the differential ring gear 92 is transmitted to the left and right axles 93$l$, 93$r$ by the differential gear device 91 while allowing difference in rotating speed between the left and right axles 93$l$, 93$r$.

Figure 1:
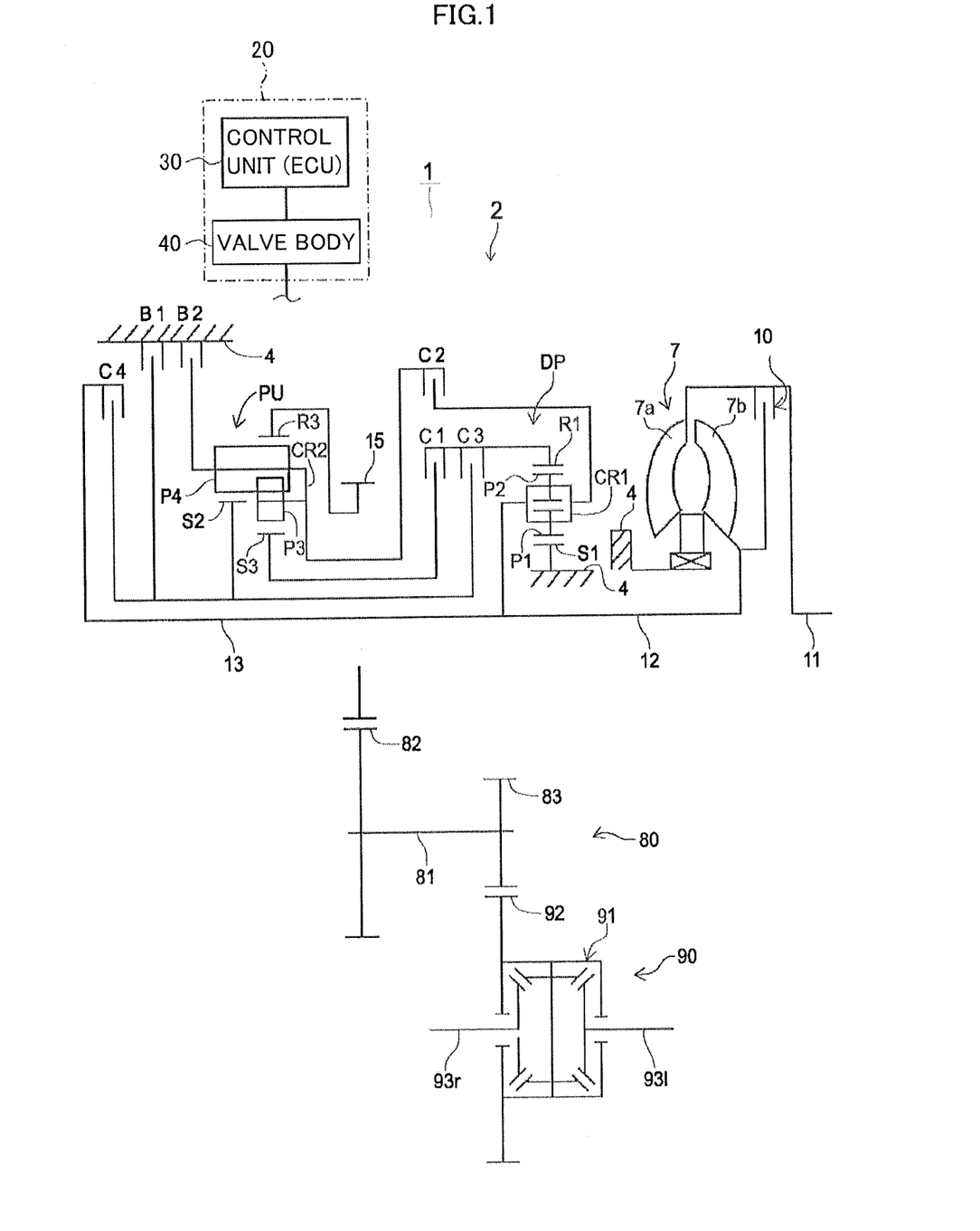
FIG. 1 is a skeleton view showing an automatic transmission according to an embodiment.
Figure 2:
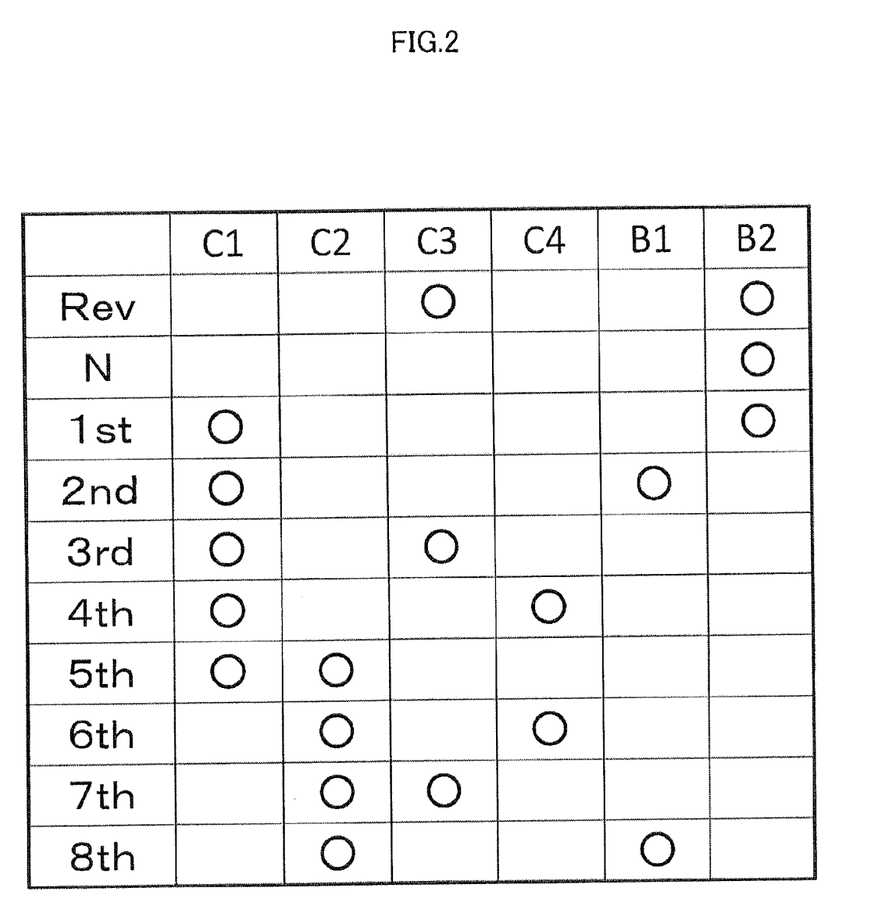
FIG. 2 is an engagement table of the automatic transmission according to the embodiment.
Figure 3:
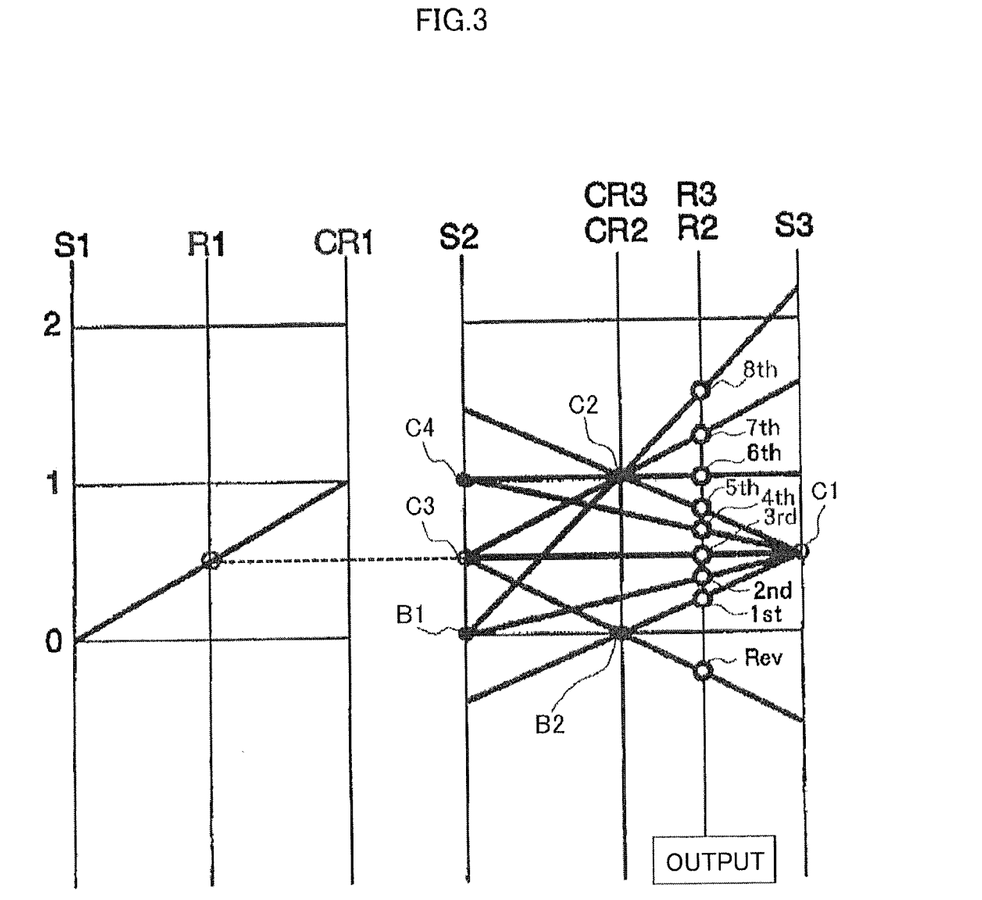
FIG. 3 is a velocity diagram of the automatic transmission according to the embodiment.

In the automatic transmission 1 as configured above, the first clutch C1 to the fourth clutch C4 and the first brake B1 and the second brake B2 shown in the skeleton view of FIG. 1 are engaged and disengaged in combinations indicated in the engagement table of FIG. 2 to establish a first forward speed (1st) to an eighth forward speed (8th) and a first reverse speed (reverse speed) (REV) at rotating speed ratios as indicated in the velocity diagram of FIG. 3. Note that, at N (neutral) range, only the second brake B2 is engaged. That is, the automatic transmission 1 is provided with a plurality of engagement elements including the second brake B2 that is engaged when establishing at least the first forward speed (a second shift speed) and the reverse speed (a first shift speed), the third clutch C3 that is engaged when establishing at least a predetermined forward speed (third forward speed, etc.) and the reverse speed, and the first clutch C1 that is engaged when establishing at least the first forward speed.

Subsequently, the hydraulic control device 20 of the automatic transmission 1 according to a preferred embodiment is explained. The hydraulic control device 20 is provided with a valve body 40 and a control unit (hereinafter, referred to as ECU) 30, as shown in FIG. 1.

Figure 4:
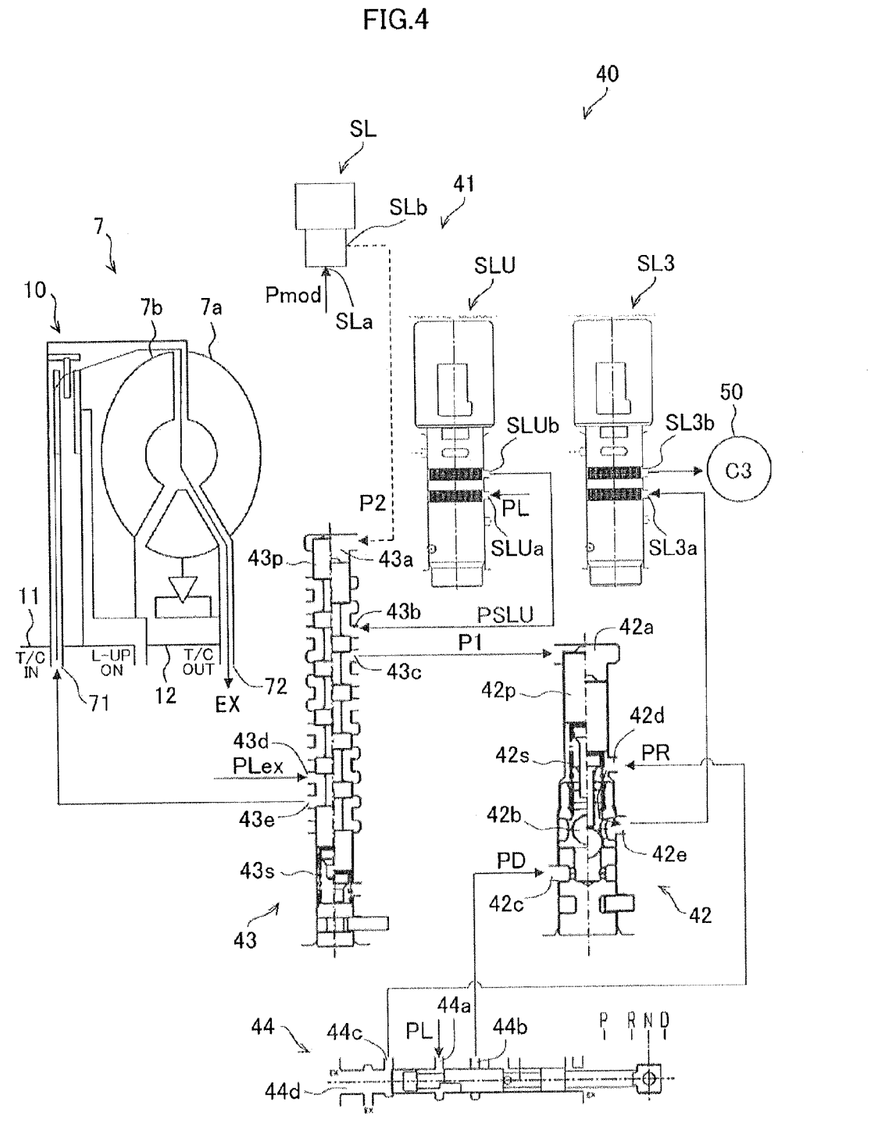
FIG. 4 is a schematic view showing a hydraulic control device according to the embodiment.

As shown in FIG. 4, the valve body 40 is controlled by the ECU 30 and provided with an oil pump (not shown), a primary regulator valve as a pressure regulating valve that regulates the hydraulic pressure from the oil pump to a line pressure PL, etc., and generates a modulator pressure Pmod, etc. besides the line pressure PL by regulating various kinds of source pressures. Note that a generating part of various kinds of source pressures is shown as a source pressure generating part 60 (refer to FIG. 6) in the present embodiment. In addition, the valve body 40 is provided with a lubricant relay valve (not shown), a circular modulator valve, a lock-up relay valve 43 that is described later, a sequence valve, etc. in which a spool position is switched or controlled to selectively switch or regulate the hydraulic pressures derived from various kinds of source pressures to respective oil passages. Configuration of a hydraulic circuit to generate the line pressure PL, the modulator pressure Pmod, etc. is a same as that of common hydraulic control devices for automatic transmissions. Therefore, detailed explanation is not provided.

In addition, the valve body 40 is provided with a manual valve 44 that supplies a forward range pressure PD and a reverse range pressure PR in accordance with switching of a travel range using the line pressure PL as the source pressure. The manual valve 44 is provided with an input port 44$a$ to which the line pressure PL is input, a forward output port 44$b$ from which the forward range pressure (a first source pressure) PD is output at a forward (D) range, a reverse output port 44$c$ from which the reverse range pressure (a second source pressure) PR is output at a reverse (R) range, and a drain port 44$d$ that drains the reverse output port 44$c$ at the D-range and the N-range.

The valve body 40 is provided with a signal pressure supplying part 41 including a linear solenoid valve (solenoid valve) SL3 that is capable of supplying an engagement pressure to a hydraulic servo 50 capable of engaging and disengaging the third clutch C3 and a lock-up solenoid valve (pressure regulating valve) that is capable of supplying a first signal pressure, and a switching valve 42. In the present embodiment, although each valve actually includes one spool, in order to describe a switching position or a control position of a spool position, a state on the right half in FIG. 4 is referred to as "right half position," and a state on the left half is referred to as "left half position."

The switching valve 42 is provided with a first input port 42$c$ to which the forward range pressure PD that is output when establishing a forward speed is input, a second input port 42$d$ to which the reverse range pressure PR that is output when establishing the reverse speed is input, and an output port 42$e$ that is allocated between the first input port 42$c$ and the second input port 42$d$ and connected to an input port SL3$a$ of the linear solenoid valve SL3. In addition, the switching valve 42 is provided with a ball (valving element) 42$b$. The ball 42$b$ is movably allocated between the first input port 42$c$ and the second input port 42$d$, moves to an input port side of a range pressure with a lower pressure between the forward range pressure PD and the reverse range pressure PR, blocks communication between the input port of the range pressure with the lower pressure and the output port 42$e$, establishes communication between an input port of a range pressure with a higher pressure and the output port 42$e$, and causes the range pressure with the higher pressure to be output from the output port 42$e$. In the present embodiment, the valving element is the ball 42$b$. However, the valving element is not limited to the ball 42$b$. The valving element may be a spool, for example. Note that the range pressure with the lower pressure is a lower hydraulic pressure between the forward range pressure PD and the reverse range pressure PR that are input from the input ports 42$c$ and 42$d$, respectively, and includes zero pressure.

In addition, the switching valve 42 is provided with a spool-shaped moving member 42$p$, an oil chamber 42$a$, and a return spring 42$s$. The moving member 42$p$ is capable of switching between a locked state in which the ball 42$b$ is pressed to the first input port 42$c$ side and locked at a blocking position (right half position) at which the communication between the first input port 42$c$ and the output port 42$e$ is blocked and an unlocked state positioned at an open position (left half position) in which the ball 42$b$ is movable. The oil chamber 42$a$ communicates with the signal pressure supplying part 41 and causes the moving member 42$p$ to move to the blocking position because of an input of a first signal pressure P1. The return spring 42$s$ is composed by, for example, a pressed coil spring, and urged such that the moving member 42p is positioned at the open position side. An urging force here is set to be smaller than a pressing force by the first signal pressure P1. Thereby, the switching valve 42 is capable of selectively supplying the forward range pressure PD and the reverse range pressure PR to the linear solenoid valve SL3 as the source pressure.

The linear solenoid valve SL3 is provided with the input port SL3a communicated with the output port 42e of the switching valve 42 and an output port SL3b communicated with the hydraulic servo 50, and changes a supply pressure by control of the ECU 30.

The signal pressure supplying part 41 is provided with the lock-up relay valve 43, a switching solenoid valve SL, and a lock-up solenoid valve SLU.

The lock-up relay valve 43 is provided with a spool 43p and a spring 43s that urges the spool 43p to an upper side of the figure, and also provided with an oil chamber 43a above the spool 43p, a first port 43b, a second port 43c, a third port 43d, and a fourth port 43e.

The oil chamber 43a is communicated with an output port SLb of the switching solenoid valve SL and capable of receiving an input of a second signal pressure P2 from the switching solenoid valve SL. The first port 43b is communicated with an output port SLUb of the lock-up solenoid valve SLU. The second port 43c is communicated with the oil chamber 42a of the switching valve 42 and capable of outputting a lock-up solenoid pressure PSLU as the first signal pressure. A circular line pressure PLex at the torque converter 7 is input to the third port 43d. The fourth port 43e is communicated with an input port 71 of the torque converter 7.

An urging force of the spring 43s is operated on the spool 43p against the second signal pressure P2 from the switching solenoid valve SL, and the spool 43p is controlled so as to be at a disengaged position (left half position) on the upper side of the figure and an engaged position (right half position) on the lower side of the figure. Thereby, in a case in which the second signal pressure P2 from the switching solenoid valve SL is input to the oil chamber 43a, the spool 43p is switched from the disengaged position to the engaged position against the spring 43s. In a case in which the spool 43p is at the engaged position, the first port 43b is communicated with a lock-up control valve (not shown), a lock-up pressure Plup (not shown) is generated based on the lock-up solenoid pressure PSLU, the lock-up clutch 10 is engaged, and the third port 43d and the fourth port 43e are blocked. In addition, in a case in which the spool 43p is at the disengaged position, the first port 43b is communicated with the second port 43c, the lock-up clutch 10 is disengaged, the lock-up solenoid pressure PSLU is supplied to the oil chamber 42a of the switching valve 42 as the first signal pressure, the third port 43d and the fourth port 43e are communicated, and the circular line pressure PLex is supplied to the input port 71 of the torque converter 7.

The switching solenoid valve SL is provided with the output port SLb that communicates with the oil chamber 43a of the lock-up relay valve 43 and an input port SLa to which the modulator pressure Pmod is input, and capable of supplying the second signal pressure P2 that switches the lock-up relay valve 43 between at the engaged position and at the disengaged position by the control of the ECU 30.

The lock-up solenoid valve SLU is provided with an input port SLUa to which the line pressure PL is input and the output port SLUb that is communicated with the first port 43b of the lock-up relay valve 43, and changes a supplied pressure by control of the ECU30 and supplies the changed pressure to the lock-up control valve to generate the lock-up pressure Plup for the lock-up clutch 10. The lock-up solenoid pressure PSLU output from the lock-up solenoid valve SLU is supplied to the switching valve 42 as the first signal pressure P1 via the lock-up relay valve 43 in a case in which the lock-up relay valve 43 is at the disengaged position.

Figure 5A:
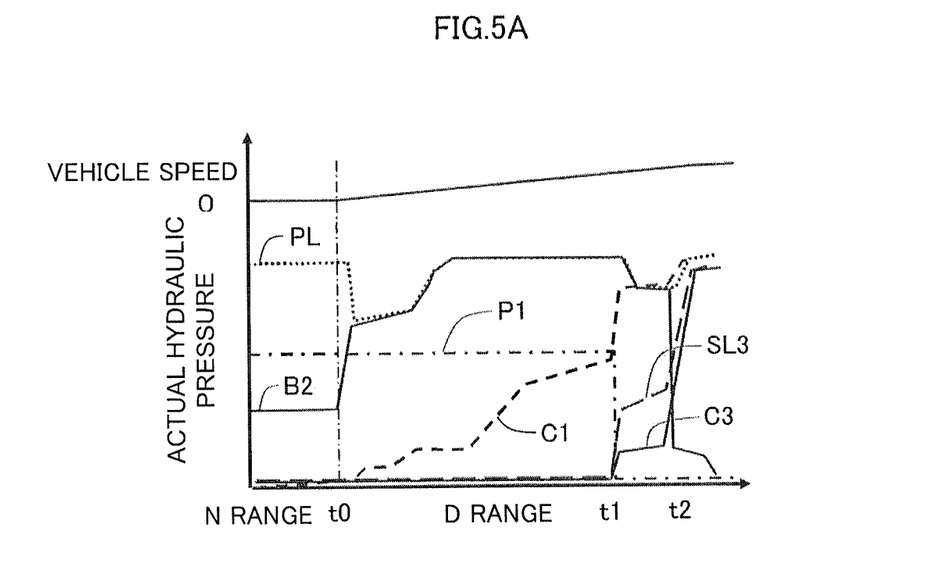
FIG. 5A shows behavior according to the present embodiment.

The ECU 30, in a case in which R-range or N-range (another range) is switched to D-range, causes the lock-up solenoid valve SLU to input the first signal pressure to the oil chamber 42a of the switching valve 42 until the first clutch C1 is brought from the disengaged state to the engaged state (refer to FIG. 5A).

Subsequently, an operation of the hydraulic control device 20 of the automatic transmission 1 according to the present embodiment is described in detail based on FIG. 4 and the timing chart shown in FIG. 5A. Here, an operation from a state in which, at a time of garage shifting, when R-range is switched to D-range via N-range, alternatively, when N-range is switched to D-range, a failure of a fixed open state has occurred at the linear solenoid valve SL3 and a vehicle speed is zero at N-range, is described.

As shown in FIG. 5A, in a case in which the vehicle speed is zero at N-range, only the second brake B2 is in a semi-engaged state, and other engagement elements are in the disengaged state. In addition, the lock-up clutch 10 is disengaged at N-range. Therefore, as shown in FIG. 4, the lock-up relay valve 43 is at the disengaged position, the lock-up solenoid pressure PSLU is output as the first signal pressure, and the switching valve 42 is in a locked state.

In addition, as shown in FIG. 5A, at t0, N-range is switched to D-range, and the ECU 30 provides a command to cause the second brake B2 and the first clutch C1 to be engaged in order to establish the first forward speed. Thereby, the engagement pressures for the second brake B2 and the first clutch C1 increase and the first forward speed is established. At this moment, the lock-up clutch 10 remains disengaged. Therefore, as shown in FIG. 4, the lock-up relay valve 43 is at the disengaged position, the lock-up solenoid pressure PSLU is output as the first signal pressure P1, and the switching valve 42 is in the locked state. Thus, the forward range pressure PD is output but blocked by the ball 42b. Therefore, the forward range pressure PD is not supplied to the linear solenoid valve SL3, thereby a tie-up of the third clutch C3 is reliably prevented.

In addition, as shown in FIG. 5A, at t1, when the first forward speed is almost completely established with the second brake B2 and the first clutch C1, the lock-up relay valve 43 is switched from the disengaged position to the engaged position to make the first signal pressure P1 to be zero. The time t1 here may be set to, for example, a timing after a predetermined period of time by measurement with a timer since the range is switched to D-range (t0), a timing in accordance with the timing of switching the lock-up relay valve 43 to the engaged position to cause the lock-up clutch 10 to be engaged, or set depending on a degree at which the first forward speed is established with the second brake B2 and the first clutch C1, etc.

Subsequent to t1, as shown in FIG. 4, the lock-up relay valve 43 is at the engaged position and the lock-up solenoid pressure PSLU is utilized to engage the lock-up clutch 10. Therefore, the first signal pressure P1 becomes zero. Thereby, the switching valve 42 becomes in the unlocked state and the forward range pressure PD is not blocked by the ball 42b but supplied to the linear solenoid valve SL3.

In addition, as shown in FIG. 5A, because the failure of a fixed open state has occurred at the linear solenoid valve SL3, the pressure PSL3 output from the linear solenoid valve SL3 rapidly increases at t2 and the third clutch C3 is also rapidly engaged. Here, the vehicle speed has increased enough. Therefore, in order to shift from the first forward speed to the third forward speed, the ECU 30 provides a command to cause the first clutch C1 and the third clutch C3 to be engaged as well as provides a command to cause the second brake B2 to be disengaged. Thus, the engagement of the first clutch C1 is maintained, the third clutch C3 is rapidly engaged, and the second brake B2 is disengaged.

Figure 5B:
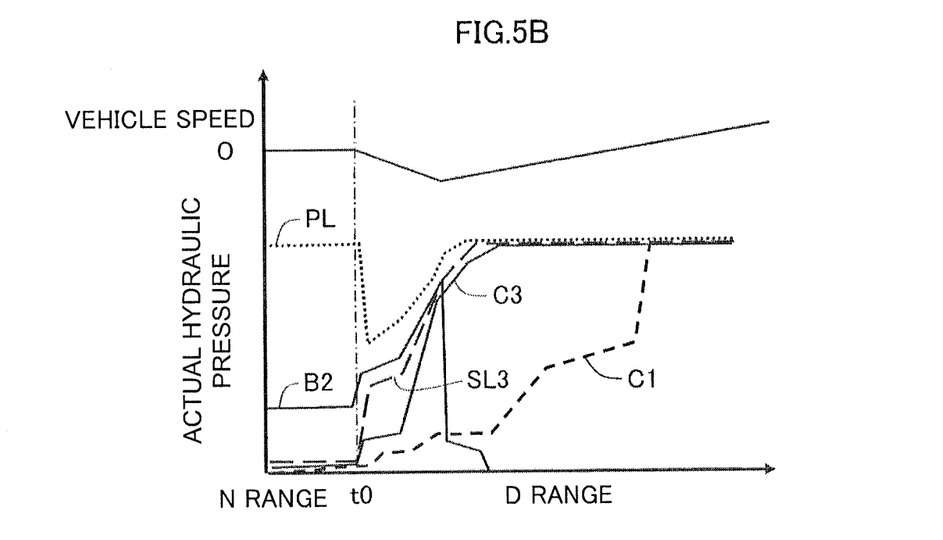
FIG. 5B shows conventional behavior.

Here, an operation in a case in which the forward range pressure PD and the reverse range pressure PR are switched using a shuttle valve and supplied to the linear solenoid valve SL3 without using the switching valve 42 as in a conventional manner is shown in FIG. 5B. At N-range, only the second brake B2 is in a semi-engaged state. In a case in which the range is switched to D-range at t0, the ECU 30 provides a command to cause the second brake B2 and the first clutch C1 to be engaged to establish the first forward speed. However, the forward range pressure PD is supplied to the linear solenoid valve SL3 in the failure of a fixed open state via the shuttle valve, the pressure PSL3 output from the linear solenoid valve SL3 suddenly increases, and the third clutch C3 is suddenly engaged. At this moment, the second brake B2 is engaged from the semi-engaged state. Therefore, the second brake B2 is fully engaged in a relatively short time. Thus, before the first clutch C1 is engaged, the third clutch C3 and the second brake B2 are engaged, thereby the reverse speed is established for a moment. On the other hand, according to the aforementioned present embodiment, even in a case in which the failure of a fixed open state has occurred at the linear solenoid valve SL3, a speed change is properly operated without the reverse speed, tie-up, etc. being generated. In the above example, a switch from N-range to D-range is described. However, the same is applied to a case of a direct switch from R-range to D-range, for example.

In case of a direct switch from R-range to D-range, the reverse range pressure PR that was supplied to the linear solenoid valve SL3 before the travel range is shifted is discharged via the switching valve 42 and the manual valve 44 from the drain port 44d of the manual valve 44. Therefore, the hydraulic pressure is not supplied from the linear solenoid valve SL3 to the third clutch C3 anymore. Thus, the third clutch C3 is not engaged before the first forward speed is established. The same effect as the case of the switch from N-range to D-range is obtained.

As described above, according to the hydraulic control device 20 of the present embodiment, in a case in which N-range or R-range is switched to D-range, the ECU 30 is configured to cause the first signal pressure P1 to be input to the oil chamber 42a of the switching valve 42 with the lock-up solenoid valve SLU until the first clutch C1 is brought from the disengaged state to the engaged state. Thus, the switching valve 42 is in the locked state until the first clutch C1 is brought from the disengaged state to the engaged state. Therefore, the forward range pressure PD is blocked by the ball 42b and the third clutch C3 becomes in the disengaged state. Thereby, at the linear solenoid valve SL3 for the third clutch C3 which is engaged at the reverse speed, disengaged at the first forward speed, and engaged at the third forward speed, even in a case in which the failure of a fixed open state has occurred when switching the range, it is possible to block the supply of the forward range pressure PD.

In addition, in the hydraulic control device 20 according to the present embodiment, the first shift speed is the reverse speed, the second shift speed is the first forward speed, the first source pressure is the forward range pressure PD, and the second source pressure is the reverse range pressure PR. Therefore, the present embodiment may be applied to the hydraulic control device 20 having the manual valve 44 that supplies the forward range pressure PD and the reverse range pressure PR in accordance with the switch of the travel range using the line pressure PL as the source pressure.

In addition, the hydraulic control device 20 according to the present embodiment is provided with: the lock-up relay valve 43 capable of switching between at the engaged position at which the torque converter 7 is positioned when bringing the lock-up clutch 10 capable of lock-up into the engaged state and at the disengaged position at which the torque converter 7 is positioned when bringing the lock-up clutch 10 into the disengaged state; the switching solenoid valve SL capable of supplying the second signal pressure P2 to switch the lock-up relay valve 43 between at the engaged position and at the disengaged position; and the lock-up solenoid valve SLU that is utilized to generate the lock-up pressure Plup for the lock-up clutch 10, in which the pressure regulating valve is the lock-up solenoid valve SLU, the first signal pressure P1 is the lock-up solenoid pressure PSLU, and the first signal pressure P1 is supplied to the switching valve 42 via the lock-up relay valve 43 in a case in which the lock-up relay valve 43 is at the disengaged position. Because the lock-up clutch 10 is basically disengaged at garage shifting, the lock-up solenoid pressure PSLU not in use can be effectively utilized and an increase in the number of parts can be suppressed.

In addition, in the hydraulic control device 20 according to the present embodiment, the valving element 42b is a ball. Therefore, for example, an occurrence of valve stuck due to metallic pieces, etc. caught in the valve structure can be suppressed.

In addition, in the hydraulic control device 20 according to the present embodiment, a case is described, in which the speed change mechanism 2 capable of establishing the eight forward speeds by engaging two engagement elements at the same time is applied. However, embodiments of the present invention are not limited thereto. For example, a speed change mechanism capable of engaging three friction engagement elements at the same time and a speed change mechanism capable of establishing, for example, six forward speeds or nine forward speeds besides the eight speeds may be applied.

In addition, in the hydraulic control device 20 according to the present embodiment, a case is described, in which the first signal pressure P1 is the lock-up solenoid pressure PSLU. However, embodiments of the present invention are not limited thereto. Other appropriate hydraulic pressure may be utilized.

In addition, in the hydraulic control device 20 according to the present embodiment, a torque converter is applied as the hydraulic power transmission device of the automatic transmission 1. However, embodiments of the present invention are not limited thereto. For example, a fluid coupling may be applied.

In addition, in the hydraulic control device 20 according to the present embodiment, a case is described, in which a shift speed in which the third clutch C3 is engaged is established subsequent to t2 in FIG. 5A. However, embodiments of the present invention are not limited thereto. For example, in a case in which hydraulic pressure supply to the third clutch C3 is detected, a so-called fail-safe valve or a valve called a cut-off valve may be operated if provided in order to block the hydraulic pressure supply to the third clutch C3. Alternatively, transition to a so-called limp-home mode may be executed. That is, transition to a fail-safe mode in accordance with the situation may be executed in a case in which a failure of a full open state has occurred at the linear solenoid valve SL3.

In addition, in the hydraulic control device 20 according to the present embodiment, a case is described, in which the first source pressure is the forward range pressure PD and the second source pressure is the reverse range pressure PR. However, embodiments of the present invention are not limited thereto. For example, the first source pressure may be the line pressure PL and the second source pressure may be an engagement pressure PSL1.

Figure 6:
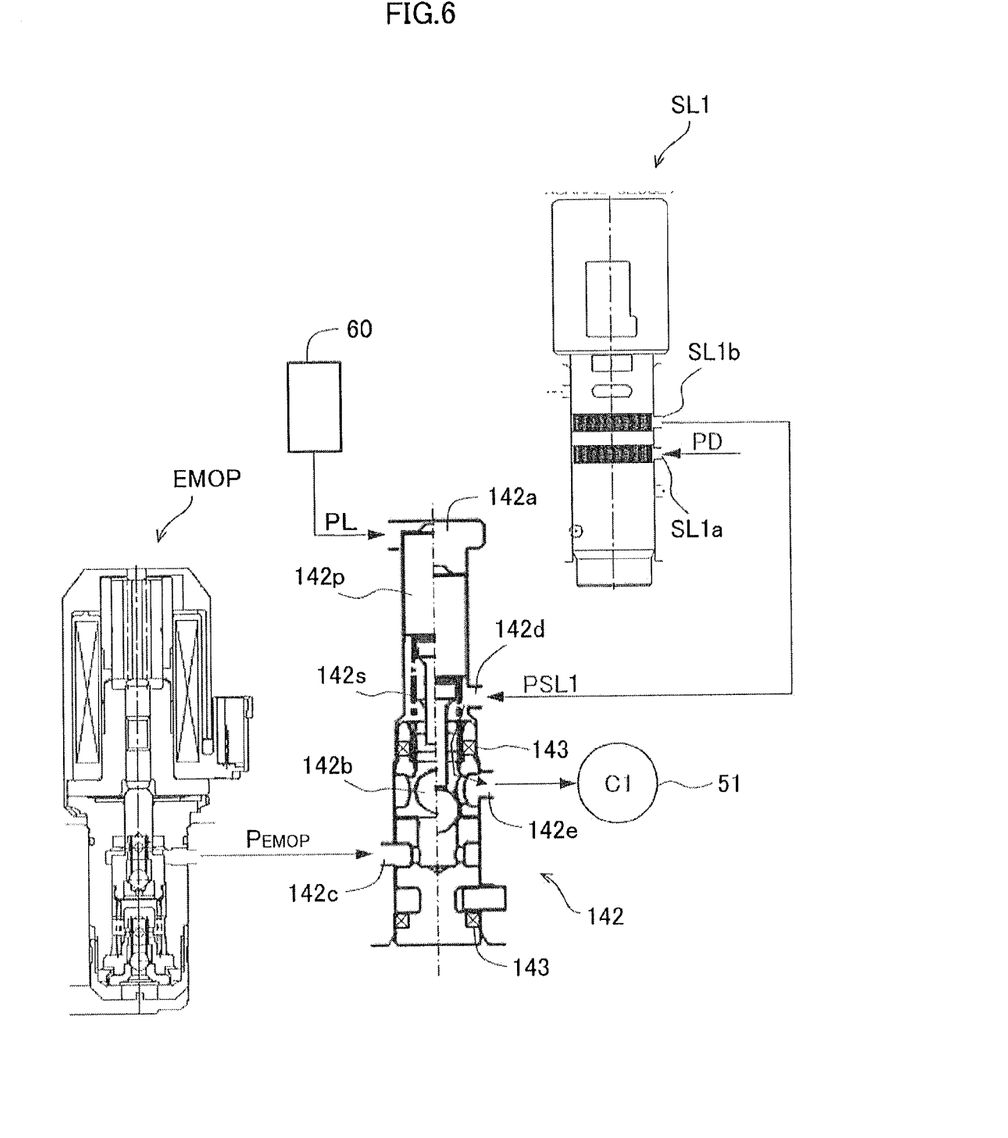
FIG. 6 is a schematic view showing a hydraulic control device according to another embodiment.

In such a case, for example, as shown in FIG. 6, a switching valve 142 is provided with a first input port 142c to which an electromagnetic pump pressure $P_{EMOP}$ of an electromagnetic pump EMOP is input, a second input port 142d to which the engagement pressure PSL1 capable of being supplied from the linear solenoid valve SL1 to the first clutch C1 is input, and an output port 142e allocated between the first input port 142c and the second input port 142d and connected to a hydraulic servo 51 of the first clutch C1. In addition, the switching valve 142 is provided with a ball (valving element) 142b. The ball 142b is movably allocated between the first input port 142c and the second input port 142d, moves to an input port side of a range pressure with a lower pressure between the electromagnetic pump pressure $P_{EMOP}$ and the engagement pressure PSL1, blocks communication between the input port of the range pressure with the lower pressure and the output port 142e, establishes communication between an input port of a range pressure with a higher pressure and the output port 142e, and causes the range pressure with the higher pressure to be output from the output port 142e.

In addition, the switching valve 142 is provided with a spool-shaped moving member 142p, an oil chamber 142a, and a return spring 142s. The moving member 142p is capable of switching between a locked state in which the ball 142b is pressed to the first input port 142c side and locked at a blocking position (right half position) at which the communication between the first input port 142c and the output port 142e is blocked and an unlocked state positioned at an open position (leftt half position) in which the ball 142b is movable. The oil chamber 142a is communicated with the source pressure generating part 60 having a primary regulator valve as a pressure regulating valve and causes the moving member 142p to move to the blocking position by an input of the line pressure PL. The return spring 142s is composed by, for example, a pressed coil spring, and urged such that the moving member 142p is positioned at the open position side. An urging force here is set to be smaller than a pressing force by the line pressure PL. Thereby, the switching valve 142 is capable of selectively supplying the electromagnetic pump pressure $P_{EMOP}$ and the engagement pressure PSL1 to the hydraulic servo 51 as the engagement pressure.

In addition, in order to prevent oil leaks between the switching valve 142 and the main body of the valve body 40, the switching valve 142 is provided with a seal ring 143 on both sides of the first input port 142c and the output port 142e in the axial direction. The electromagnetic pump EMOP has a small discharging amount. Therefore, management of an amount of oil leaks in a hydraulic circuit is important. The amount of oil leaks can be reduced by providing the seal ring 143 at the switching valve 142.

The linear solenoid valve SL1 is provided with an input port SL1a to which the forward range pressure PD is input as the source pressure and an output port SL1b that communicates with the second input port 142d, and changes a supply pressure by control of the ECU 30.

According to the hydraulic control device shown in FIG. 6, when an engine is stopped, the electromagnetic pump pressure $P_{EMOP}$ is supplied to the hydraulic servo 51 via the switching valve 142 by an operation of the electromagnetic pump EMOP, and the first clutch C1 becomes engageable. In addition, when the engine is in operation, the line pressure is supplied from the source pressure generating part 60. Therefore, the switching valve 142 is switched to the locked state. Thus, the engagement pressure PSL1 from the linear solenoid valve SL1 is supplied to the hydraulic servo 51 via the switching valve 142, and the first clutch C1 becomes engageable. At this moment, the switching valve 142 is in the locked state. Therefore, even in a case in which the electromagnetic pump pressure $P_{EMOP}$ is supplied to the switching valve 142, the electromagnetic pump pressure $P_{EMOP}$ is blocked.

DESCRIPTION OF THE REFERENCE NUMERALS

2: AUTOMATIC TRANSMISSION
7: TORQUE CONVERTER (FLUID TRANSMISSION DEVICE)
10: LOCK-UP CLUTCH
20: HYDRAULIC CONTROL DEVICE
30: ECU (CONTROL UNIT)
42: SWITCHING VALVE
42a: OIL CHAMBER
42b: BALL (VALVING ELEMENT)
42c: FIRST INPUT PORT
42d: SECOND INPUT PORT
42e: OUTPUT PORT
42p: MOVING MEMBER
43: LOCK-UP RELAY VALVE
60: SOURCE PRESSURE GENERATING PART (PRESSURE REGULATING VALVE)
142: SWITCHING VALVE
142a: OIL CHAMBER
142b: BALL (VALVING ELEMENT)
142c: FIRST INPUT PORT
142d: SECOND INPUT PORT
142e: OUTPUT PORT
142p: MOVING MEMBER
B2: SECOND BRAKE (FIRST ENGAGEMENT ELEMENT)
C1: FIRST CLUTCH (THIRD ENGAGEMENT ELEMENT)
C3: THIRD CLUTCH (SECOND ENGAGEMENT ELEMENT)
P1: FIRST SIGNAL PRESSURE
P2: SECOND SIGNAL PRESSURE
PD: FORWARD RANGE PRESSURE (FIRST SOURCE PRESSURE)
$P_{EMOP}$: ELECTROMAGNETIC PUMP PRESSURE (FIRST SOURCE PRESSURE)
PL: LINE PRESSURE (FIRST SIGNAL PRESSURE)
PR: REVERSE RANGE PRESSURE (SECOND SOURCE PRESSURE)
PSL1: ENGAGEMENT PRESSURE (SECOND SOURCE PRESSURE)
PSLU: LOCK-UP SOLENOID PRESSURE
SL: SWITCHING SOLENOID VALVE
SL1: LINEAR SOLENOID VALVE (SOLENOID VALVE)
SL3: LINEAR SOLENOID VALVE (SOLENOID VALVE)

SLU: LOCK-UP SOLENOID VALVE (PRESSURE REGULATING VALVE)

The invention claimed is:

1. A hydraulic control device for an automatic transmission provided with a plurality of engagement elements including a first engagement element that is operated by hydraulic pressure and engaged at both a first shift speed and a second shift speed, a second engagement element that is operated by hydraulic pressure, engaged when establishing the first shift speed, and disengaged when establishing the second shift speed, and a third engagement element that is operated by hydraulic pressure, disengaged when establishing the first shift speed, and engaged when establishing the second shift speed, the hydraulic control device for the automatic transmission comprising:
   a solenoid valve capable of supplying an engagement pressure to the second engagement element;
   a pressure regulating valve capable of supplying a first signal pressure;
   a switching valve having
      a first input port to which a first source pressure is input,
      a second input port to which a second source pressure is input,
      an output port that is allocated between the first input port and the second input port,
      a valving element that is movably allocated between the first input port and the second input port, moves to an input port side of a source pressure with a lower pressure between the first source pressure and the second source pressure, blocks communication between the input port of the source pressure with the lower pressure and the output port, establishes communication between an input port of a source pressure with a higher pressure and the output port, and causes the source pressure with the higher pressure to be output from the output port,
      a moving member capable of switching between a locked state in which the valving element is pressed to the first input port side and locked at a blocking position at which the communication between the first input port and the output port is blocked and an unlocked state in which the valving element is movable, and
      an oil chamber that receives an input of the first signal pressure from the pressure regulating valve and causes the first signal pressure to operate to move the moving member to the blocking position, and
   capable of selectively supplying the first source pressure and the second source pressure to the solenoid valve; and
   a control unit that, when shifting from the first shift speed to the second shift speed, causes the first signal pressure to be input to the oil chamber of the switching valve with the pressure regulating valve at least until the third engagement element is brought into an engaged state from a disengaged state.

2. The hydraulic control device for the automatic transmission according to claim 1, wherein
   the first shift speed is a reverse speed,
   the second shift speed is a first forward speed,
   the first source pressure is a forward range pressure, and
   the second source pressure is a reverse range pressure.

3. The hydraulic control device for the automatic transmission according to claim 2, comprising:
   a lock-up relay valve capable of switching between an engaged position at which the hydraulic power transmission device is positioned when bringing a lock-up clutch capable of lock-up into an engaged state and a disengaged position at which the hydraulic power transmission device is positioned when bringing the lock-up clutch into a disengaged state;
   a switching solenoid valve capable of supplying a second signal pressure to switch the lock-up relay valve between at the engaged position and at the disengaged position; and
   a lock-up solenoid valve being used to generate a lock-up pressure for the lock-up clutch,
   wherein the pressure regulating valve is the lock-up solenoid valve,
   the first signal pressure is a lock-up solenoid pressure, and
   the first signal pressure is supplied to the switching valve via the lock-up relay valve in a case in which the lock-up relay valve is at the disengaged position.

4. The hydraulic control device for the automatic transmission according to claim 3, wherein the valving element is a ball.

5. The hydraulic control device for the automatic transmission according to claim 1, comprising:
   a lock-up relay valve capable of switching between an engaged position at which the hydraulic power transmission device is positioned when bringing a lock-up clutch capable of lock-up into an engaged state and a disengaged position at which the hydraulic power transmission device is positioned when bringing the lock-up clutch into a disengaged state;
   a switching solenoid valve capable of supplying a second signal pressure to switch the lock-up relay valve between at the engaged position and at the disengaged position; and
   a lock-up solenoid valve being used to generate a lock-up pressure for the lock-up clutch,
   wherein the pressure regulating valve is the lock-up solenoid valve,
   the first signal pressure is a lock-up solenoid pressure, and
   the first signal pressure is supplied to the switching valve via the lock-up relay valve in a case in which the lock-up relay valve is at the disengaged position.

6. The hydraulic control device for the automatic transmission according to claim 5, wherein the valving element is a ball.

7. The hydraulic control device for the automatic transmission according to claim 1, wherein
   the first shift speed is a reverse speed,
   the second shift speed is a first forward speed,
   the first source pressure is a line pressure, and
   the second source pressure is an engagement pressure.

8. The hydraulic control device for the automatic transmission according to claim 7, wherein the valving element is a ball.

9. The hydraulic control device for the automatic transmission according to claim 1, wherein the valving element is a ball.

10. The hydraulic control device for the automatic transmission according to claim 2, wherein the valving element is a ball.

* * * * *